United States Patent Office 3,671,070
Patented June 20, 1972

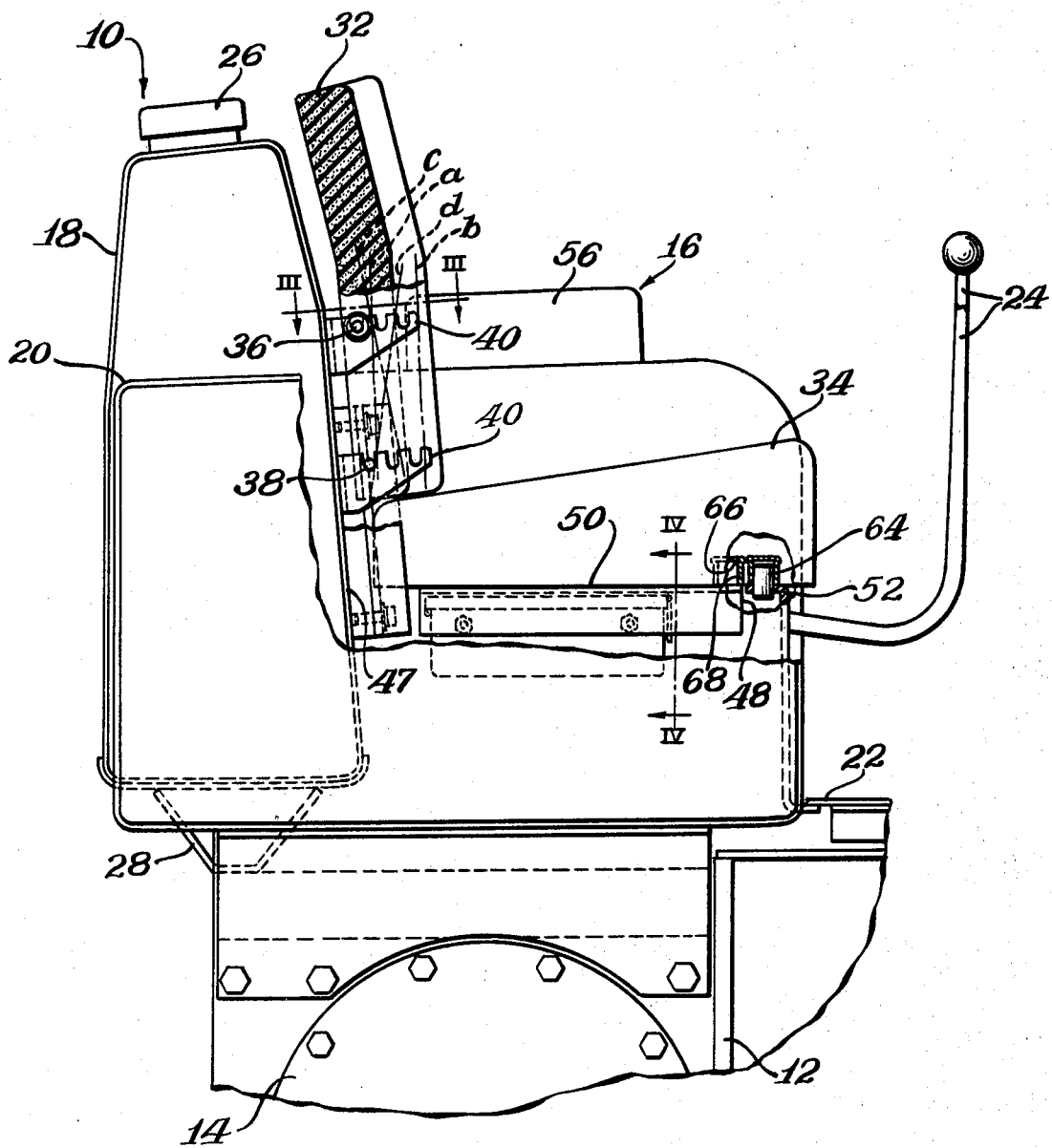

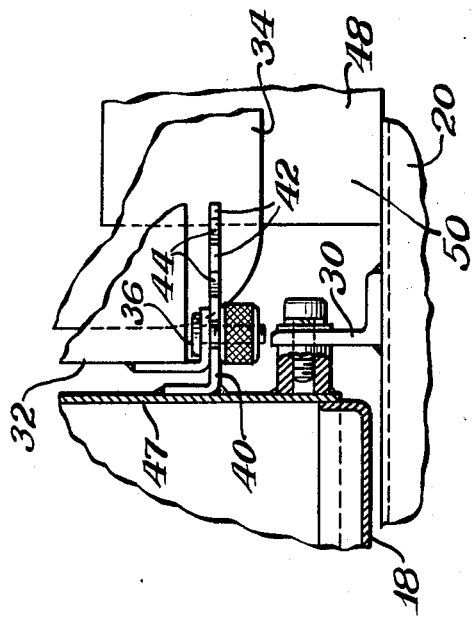
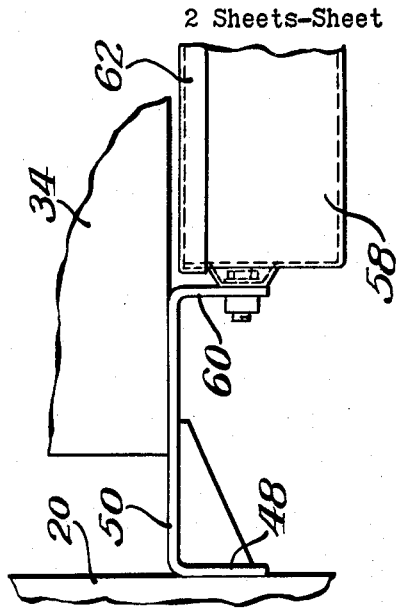
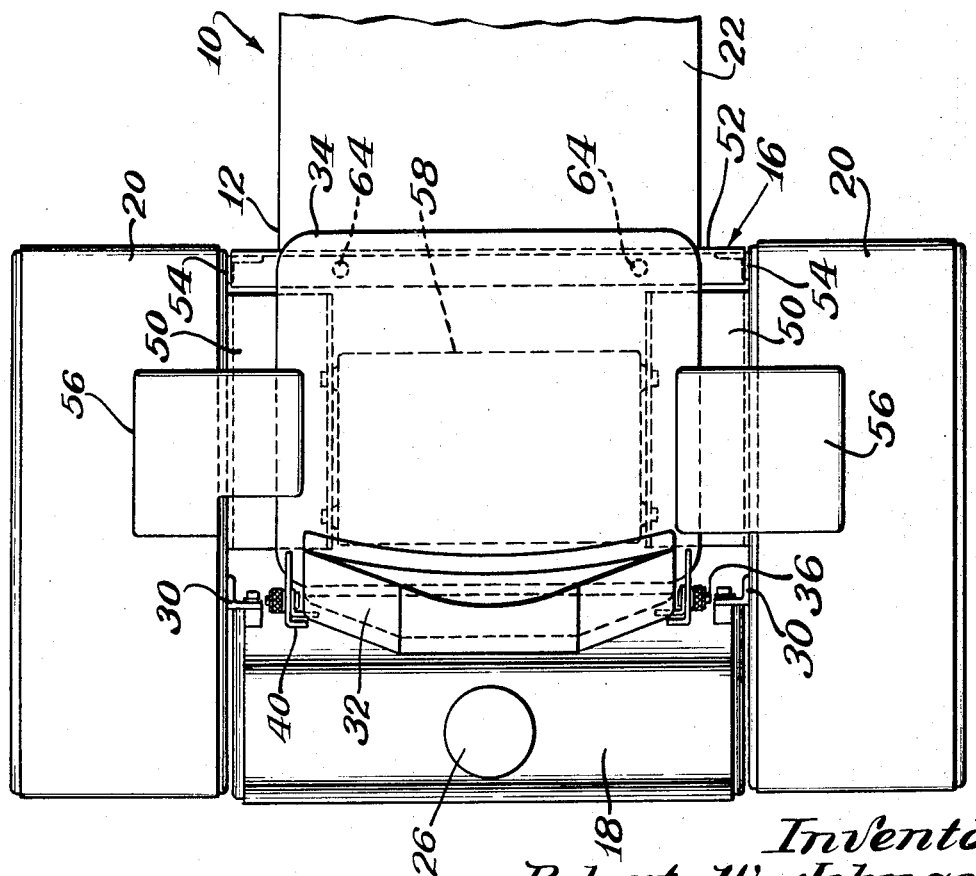

3,671,070
COMBINATION FUEL TANK AND OPERATOR'S SEAT FOR TRACTORS
Robert W. Johnson, Winfield, and Harvey B. Karpiel, Roselle, Ill., assignors to International Harvester Company, Chicago, Ill.
Filed Aug. 17, 1970, Ser. No. 64,481
Int. Cl. B60n 1/06
U.S. Cl. 296—65 R    2 Claims

ABSTRACT OF THE DISCLOSURE

A combination body-tank-seat assembly for tractors wherein the tractor operator is seated forwardly of the tractor fuel tank, and wherein the operator, his seat, and the fuel tank are all located between box-like body structures provided at the sides of, and in assembly with, the overall combination.

---

This invention relates to a tractor seat. It particularly relates to a combination body-tank-seat assembly for tractors wherein the tractor operator is seated forwardly of the tractor fuel tank, and wherein the operator, his seat, and the fuel tank are all located between box-like body structures provided at the sides of, and in assembly with, the overall combination.

In other terms, a tractor seat frame provided by our invention can be described as a combined assembly including a forwardly sloping front wall of the existing fuel tank, and including a cushion framework comprising existing body side box structures.

Such combination results in the full utility of certain parts, and in certain advantages flowing therefrom such as compactness and simplicity of the assembly, and fewer parts needed therein.

Various features, objects, and further advantages will either be specifically pointed out or become apparent when, for a better understanding of our invention, reference is made to the following description taken in conjunction with the accompanying drawings, which show a preferred embodiment thereof and in which:

FIG. 1 is in elevation, as viewed from the right side of just the rear portion of a crawler tractor embodying the invention;

FIG. 2 is in top plan; and

FIGS. 3 and 4 are plan and elevational cross-sectional views, respectively, of a back rest adjustment detail taken downwardly along the line III—III in FIG. 1, and of a slideway detail taken rearwardly along the line IV—IV in FIG. 1.

More particularly in FIGS. 1 and 2, the rear end portion of the body of a crawler tractor 10 is shown having a supporting rear main frame 12. The main frame 12 carries the usual assembly 14 of a steering drive and final drive.

A seat frame 16 provided on the tractor for the tractor operator includes a rear fuel tank 18. Both the fuel tank 18 and the operator are located so as to be between right and left side box structures 20 and immediately behind a foot platform 22. The fuel tank 18 is disposed in a transverse vertical plane and the side box structures 20 are transversely spaced apart and in parallel planes which extend fore and aft. Right and left steering hand levers 24 extend from pivoted connections in the seat frame 16 forwardly and upwardly to a hand-level position over the foot platform 22. Standard body and chassis parts used for the rest of the supporting structure are well known, and are omitted from this disclosure.

At its upper center, the fuel tank 18 carries a screw-on filler cap 26 closing the fuel filler neck. A base bracket 28 supported on the rear main frame 12 rigidly supports the fuel tank 18 at the bottom. Screw-supporting side brackets 30 are disposed one at each side of the fuel tank 18 (FIGS. 2 and 3) and each secures the fuel tank 18 to the side box structure 20 at that side by means of a bracket weld.

The seat frame 16 carries a backrest 32 and a seat cushion 34.

The backrest 32 includes a foam rubber cushion containing an internal frame which, at the sides, carries two laterally extending upper pegs 36 and two laterally extending lower unthreaded pegs 38. Two vertically spaced apart supporting racks 40 at each side of the backrest 32 are adjacent the two pegs 36 and 38 at that side, and each carries a set of upstanding teeth 42 defining a plurality of fore and aft spaced apart upwardly open, peg slots 44 (FIG. 3) selectively receiving the adjacent peg. The upper pegs 36 at opposite sides of the backrest 32 are threaded and carry clamping nuts having a screwed down position on the peg clamping the adjacent rack for locking the backrest.

The racks 40 are cantilevered at the foot by means of individual attachment flanges thereon welded to an adjacent point on the forwardly sloping front wall 47 (FIG. 3) of the fuel 18. Depending upon which of the slots 44 are selectively occupied by the pegs received in the racks 40, the backrest 32 takes a position with its generally vertical plane $a$ either into or out of a forward position having the parallel plane $b$, or into or out of a non-vertical position or an opposite substantially vertical position with the plane at $c$ or $d$ respectively, for example. The backrest 32 in any position and at any selected angularity to the vertical overlies the rear of the seat cushion 34 and so fits therewith as to hold down the rear of the latter.

SEAT CUSHION FRAMEWORK—FIGS. 1–4

Included in this framework, seat cushion slide structures 48 provided with downturned parallel flanges, have upper web surfaces forming fore and aft slides 50 and are securely welded at the outer side of a downturned flange to the adjacent side box structure 20 at that side. The seat cushion 34 forms the slider on the slides in the framework, which framework includes a front cross member 52 transverse to the slides. At each side of the framework, a cross member end bracket 54 (FIG. 2) secures the cross member to the box structure 20 at that side.

Right and left arm rests 56 carried by the respective side box structures 20 extend inwardly so as to partly overlie the seat cushion 34, and present vertical portions, not shown, extending down to a point juxtaposed to the cushion.

Rearwardly of the cross member 52, a transversely disposed underseat box 58 is secured by screws at each side to an inner downturned flange 60 (FIG. 4) carried by the slide structure 48 at that side. A box cover 62 hinged at the rear is swung upwardly and back to open the underseat box 58 when the seat cushion 34 thereover is removed.

SEAT CUSHION ADJUSTMENT

Two upstanding pegs 64 in the framework front cross member 52 have the same athwart spacing as two longitudinal rows of peg sockets 66 which are in, and open downwardly from, the seat cushion 34. The sockets 66 in each row have radially springy inner cylindrical walls 68 which frictionally engage the upstanding peg 64, interfitting therewith to hold down the front portion of the seat cushion 34 against unwanted jostling.

The seat cushion 34 is hand adjusted by lifting the front portion to disengage from the pegs 64 into a withdrawn position, whereupon the selected sockets 66 are brought into registry and the cushion lowered so that the pegs 64 are socketed therein. The movement is like a slider moving on a slideway, into the adjusted positions. The adjusted positions are precisely aligned fore and aft with one another, the positions being determined and so aligned by the points at which the bottom pegs enter corresponding sockets.

The side box structures 20 of the body, the fuel tank 18 at the rear, and the framework front cross member 52 cooperate as a solid environment for the rest of the seat frame, and the combination disclosed makes a rigid seat assembly. The side box structures 20 are also used for housing hydraulic auxiliary equipment such as a spring-hydraulic accumulator, if any, and for general storage. The underseat box 58 is centrally located and also is used for storage, preferably tools.

In order to accommodate their seating function, the side box structures 20 will necessarily be spaced apart by the general width of a tractor seat. In order to accommodate its dual function, the rearwardly inclining wall 47 of the tank 18 will present an acute vertical angle as dictated by a backrest design rearward tilt suitable for the average operator.

Variations within the spirit and scope of the invention described are equally comprehended by the foregoing description.

What is claimed is:

1. In combination with a tractor body having a rear end portion:
  a transversely disposed, generally upright fuel tank supported on the rear end portion of said tractor body, said tank presenting a forwardly facing wall of the tank having a slight rearward tilt so as to be disposed at an acute vertical angle;
  a seat frame including the tank and including a framework at the lower portion of, and extending forwardly from, the tank;
  seating means supported by the seat frame comprising a backrest and a seat cushion;
  said backrest having a number of laterally extending pegs at each side, and having that number of adjacent backrest racks at each side supported cantileverly upon, and projecting forwardly of, said tank wall;
  a set of upstanding teeth on each rack defining a plurality of fore and aft spaced apart, upwardly open peg slots, selectively occupied by the adjacent peg for fore and aft positioning of the backrest first either into or out of a substantially vertical reference plane or second into vertical or non-vertical positioned spaced apart therefrom in the fore and aft direction;
  clamping nuts disposed one at each side of the backrest, each carried on screw threads by a peg at that side and having a screwed down position clamping the adjacent rack for locking the backrest at its selected angularity and position;
  a transversely disposed crossmember in said framework;
  a transversely disposed toolbox, behind the crossmember and together with the crossmember extending toward each side of the framework; and
  fore and aft extending seat cushion slide structure at each side of the framework fixed rigidly with respect to the crossmember and the box at that side, and having laterally spaced apart slides slidably supporting the seat cushion;
  said toolbox being bridged between and supported by the slides.

2. In combination with a tractor body having a rear end portion:
  a transversely disposed, generally upright fuel tank supported on the rear end portion of said tractor body, said tank presenting a forwardly facing wall of the tank having a slight rearward tilt so as to be disposed at an acute vertical angle;
  a seat frame including the tank and including a framework at the lower portion of, and extending forwardly from, the tank;
  seating means supported by the seat frame comprising a backrest and a seat cushion;
  said framework comprising a fore and aft seat slide on which the seat cushion is the slider supported thereon, and a front crossmember transverse to the seat slide;
  a plurality of spaced apart bottom pegs along the front crossmember having upright axes;
  longitudinal rows of peg sockets in the underside of the seat cushion, each row adjacent a bottom peg and selectively occupied thereby for adjusting the seat cushion on the slide into determined positions which are precisely aligned fore and aft with one another and which are determined and so aligned by the bottom pegs;
  said backrest having a number of laterally extending pegs at each side, and having that number of adjacent backrest racks at each side supported cantileverly upon, and projecting forwardly of, said tank wall;
  a set of upstanding teeth on each rack defining a plurality of fore and aft spaced apart, upwardly open peg slots, selectively occupied by the adjacent peg for fore and aft positioning of the backrest first either into or out of a substantially vertical reference plane or second into vertical or non-vertical positions spaced apart therefrom in the fore and aft direction;
  clamping nuts disposed one at each side of the backrest, each carried on spool threads by a peg at that side and having a screwed down position clamping the adjacent rack for locking the backrest at its selected angularity and position;
  the peg sockets having locations in the seat cushion and having inner cylindrical measurements so located and so measured that the peg sockets frictionally engage the selected pegs occupying same to hold down the front portion of the seat cushion against unwanted jostling;
  the backrest at the bottom overlying the seat cushion at the rear to hold down the rear portion of the seat cushion against unwanted jostling.

References Cited

UNITED STATES PATENTS

| | | | |
|---|---|---|---|
| 2,587,751 | 3/1952 | Murphy | 296—65 R |
| 3,325,308 | 2/1966 | Conner | 297—337 |
| 2,723,710 | 11/1955 | Steward et al. | 297—344 X |
| 1,888,787 | 11/1932 | Carlson | 296—65 R |
| 2,732,963 | 1/1956 | Grubich | 280—5 A X |

FOREIGN PATENTS

| | | | |
|---|---|---|---|
| 590,180 | 3/1925 | France | 297—357 |

BENJAMIN HERSH, Primary Examiner

J. A. PEKAR, Assistant Examiner

U.S. Cl. X.R.

280—5A; 297—357